US012761109B2

(12) United States Patent
Lin et al.

(10) Patent No.: US 12,761,109 B2
(45) Date of Patent: Oct. 13, 2026

(54) MONITORING SYSTEM AND METHOD

(71) Applicant: INDUSTRIAL TECHNOLOGY RESEARCH INSTITUTE, Hsinchu (TW)

(72) Inventors: Yu-Kun Lin, Taichung City (TW); Chia-Jen Ting, Hsinchu County (TW); Chih-Chiang Weng, Taoyuan City (TW); Ching-I Tai, Hsinchu City (TW); ZhongYi Yang, Kaohsiung City (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 441 days.

(21) Appl. No.: 18/396,472

(22) Filed: Dec. 26, 2023

(65) Prior Publication Data

US 2025/0172453 A1 May 29, 2025

(30) Foreign Application Priority Data

Nov. 29, 2023 (TW) ................................ 112146305

(51) Int. Cl.
*G06F 11/30* (2006.01)
*G01M 7/02* (2006.01)
*G01M 13/00* (2019.01)

(52) U.S. Cl.
CPC ............ *G01M 7/025* (2013.01); *G01M 13/00* (2013.01)

(58) Field of Classification Search
CPC .................................................... G01M 7/025
See application file for complete search history.

(56) References Cited

U.S. PATENT DOCUMENTS 7,016,799 B2 3/2006 Dondi
9,403,254 B2 8/2016 Hwang et al.
(Continued)

FOREIGN PATENT DOCUMENTS

CN 110340746 A 10/2019
CN 114473880 A 5/2022
(Continued)

OTHER PUBLICATIONS

TW Notice of Allowance dated Nov. 20, 2024 in application 112146305.
(Continued)

*Primary Examiner* — Phuong Huynh
(74) *Attorney, Agent, or Firm* — Maschoff Brennan

(57) ABSTRACT

A monitoring system includes a vibrating module, an acoustic emission sensor and a processing device. The vibrating module is configured to vibrate a target object. The acoustic emission sensor is configured to sense an acoustic emission signal with liquid generated by a deformation of the target object. The processing device is connected to the vibrating module and the acoustic emission sensor, and is configured to receive the acoustic emission signal and perform: dividing the acoustic emission signal into signal segments having a same time length, performing a time-frequency transformation on the signal segments to generate power spectrums, performing an average calculation on the power spectrums to generate a power spectral density, and adjusting or maintaining an operation parameter of the vibrating module according to a comparison result between a default difference value and a difference value between a maximum value of the power spectral density and a set value.

11 Claims, 4 Drawing Sheets

(56) References Cited

U.S. PATENT DOCUMENTS

| | | | |
|---|---|---|---|
| 11,633,825 | B2 | 4/2023 | Hykes |
| 2010/0202581 | A1 | 8/2010 | Kitajima et al. |
| 2021/0297012 | A1 | 9/2021 | Ertz et al. |

FOREIGN PATENT DOCUMENTS

| | | | | |
|---|---|---|---|---|
| CN | 115574925 | | * | 1/2023 |
| CN | 113997122 | | * | 3/2024 |
| CN | 120492875 | | * | 8/2025 |
| JP | S62107945 | A | | 5/1987 |
| JP | 4549818 | B2 | | 9/2010 |
| JP | 2018047508 | A | | 3/2018 |
| JP | 2018075704 | A | | 5/2018 |
| JP | 2021171909 | A | | 11/2021 |
| JP | 7301610 | B2 | | 7/2023 |
| TW | 201111111 | A | | 4/2011 |
| TW | M465990 | U | | 11/2013 |
| TW | 201736849 | A | | 10/2017 |
| TW | 201840383 | A | | 11/2018 |
| TW | 1672192 | B | | 9/2019 |
| TW | 1687696 | B | | 3/2020 |
| WO | 2021011271 | A1 | | 1/2021 |

OTHER PUBLICATIONS

Pivkin, Petr et al., "A new method for monitoring grinding processes using accelerometers", Proceedings of SPIE, vol. No 12122., Jun. 8, 2022.

Shen, Chia-Hsuan, "Acoustic emission based grinding wheel wear monitoring: Signal processing and feature extraction", Applied Acoustics, vol. No. 196, Jul. 2022.

Hwang, T.W et al., "Acoustic emission monitoring of high speed grinding of silicon nitride", Ultrasonics, vol. No 38., 2000.

Gomes de Oliveira, J.F et al., "Application of AE Contact Sensing in Reliable Grinding Monitoring", CIRP Annals, vol. No. 50, issue No. 1, 2001.

Brinksmeier, E. et al., "Development and Application of a Wheel Based Process Monitoring System in Grindin", CIRP Annals, vol. No. 54, issue No. 1 , 2005.

Varghese, B. et al., "Development of a Sensor-Integrated Intelligent Grinding Wheel for In-Process Monitoring", CIRP Annals, vol. No. 49, issue No. 1, 2000.

Tao, Hongfei et al., "Effects of wheel spindle vibration on surface formation in wafer self-rotational grinding process", International Journal of Mechanical Sciences, vol. No. 232, Oct. 15, 2022.

Warren Liao, T. et al., "Feature extraction and selection from acoustic emission signals with an application in grinding wheel condition monitoring", Engineering Applications of Artificial Intelligence, vol. No. 23, issue No. 1, Feb. 2010.

Karpuschewski, B. et al., "Grinding Monitoring System Based on Power and Acoustic Emission Sensors", CIRP Annals, vol. No. 49, issue No. 1, 2000.

Liu, Chien-Sheng et al. , "Grinding Wheel Loading Evaluation by Using Acoustic Emission Signals and Digital Image Processing", Sensors (Basel), Jul. 22, 2020.

Yang, Zhensheng et al., "Grinding wheel wear monitoring based on wavelet analysis and support vector machine", The International Journal of Advanced Manufacturing Technology, vol. No. 62, Dec. 4, 2011.

Viera, Martin et al., "Low-Cost Piezoelectric Transducer for Ceramic Grinding Monitoring", IEEE Sensors Journal, vol. No. 19, Sep. 1, 2019.

Chen, X. et al., "Precision grinding using CBN wheels", International Journal of Machine Tools & Manufacture, vol. No. 42, 2002.

Lakhdari, Fouad et al., "Surface and subsurface damage in Zerodur glass ceramic during ultrasonic assisted grinding", Int J Adv Manuf Technol, 2017.

* cited by examiner

MONITORING SYSTEM AND METHOD

CROSS-REFERENCE TO RELATED APPLICATIONS

This non-provisional application claims priority under 35 U.S.C. § 119 (a) on Patent Application No(s). 112146305 filed in Republic of China (ROC) on Nov. 29, 2023, the entire contents of which are hereby incorporated by reference.

BACKGROUND

1. Technical Field

This disclosure relates to a monitoring system and method.

2. Related Art

In the existing processing technology of grinding wheels, cutting tools and other tools, including the use of ultrasonic vibration module to generate vibration of corresponding frequency and direction. The vibration is transmitted to the grinding wheel frame through an adapter plate, causing the vibration on the abrasive on the grinding wheel frame, thereby achieving the purpose of grinding and polishing. In order to ensure the functionality and stability of the vibration module, a variety of technologies have been developed to monitor the vibration status (amplitude and frequency, etc.) of the vibration module, such as laser rangefinders, accelerometers, strain gauges and the use of piezoelectric materials to measure displacement, etc.

SUMMARY

According to one or more embodiment of this disclosure, a monitoring system includes a vibrating module, an acoustic emission sensor and a processing device. The vibrating module is configured to vibrate a target object. The acoustic emission sensor is configured to sense an acoustic emission signal generated by a deformation of the target object with liquid as sensing medium. The processing device is connected to the vibrating module and the acoustic emission sensor, and is configured to receive the acoustic emission signal and perform: dividing the acoustic emission signal into a plurality of signal segments, wherein the plurality of signal segments have a same time length; performing a time-frequency transformation on the plurality of signal segments to generate a plurality of power spectrums of the plurality of signal segments; performing an average calculation on the plurality of power spectrums to generate a power spectral density; and adjusting or maintaining an operation parameter of the vibrating module according to a comparison result between a difference value and a default difference value, wherein the difference value is a difference between a maximum value of the power spectral density and a set value.

According to one or more embodiment of this disclosure, a monitoring method, performed by a processing device, includes: obtaining an acoustic emission signal sensed by an acoustic emission sensor sensing a target object with liquid as sensing medium, wherein the target object is vibrated by a vibrating module to deform; dividing the acoustic emission signal into a plurality of signal segments, wherein the plurality of signal segments have a same time length; performing a time-frequency transformation on the plurality of signal segments to generate a plurality of power spectrums of the plurality of signal segments; performing an average calculation on the plurality of power spectrums to generate a power spectral density; and adjusting or maintaining an operation parameter of the vibrating module according to a comparison result between a difference value and a default difference value, wherein the difference value is a difference between a maximum value of the power spectral density and a set value.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
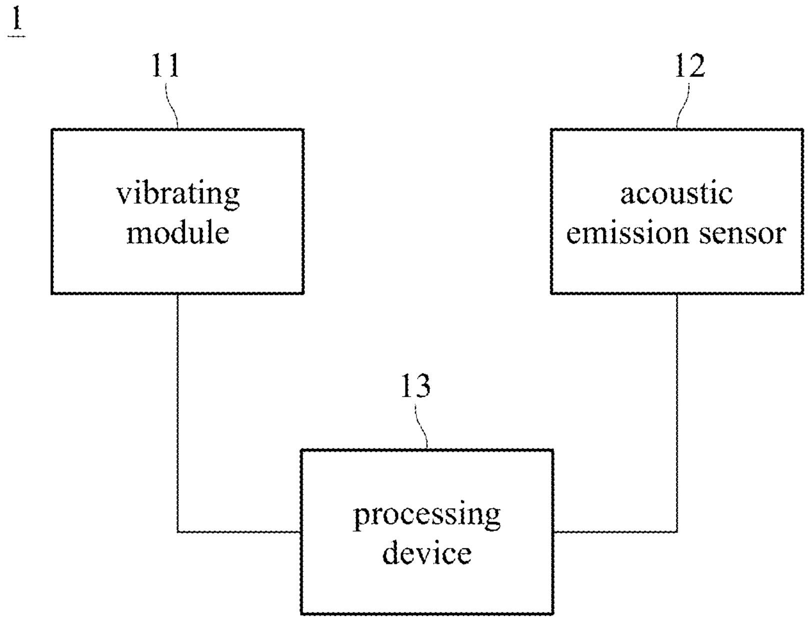
FIG. 1 is a block diagram illustrating a monitoring system according to an embodiment of the present disclosure.

Please refer to FIG. 1, wherein FIG. 1 is a block diagram illustrating a monitoring system according to an embodiment of the present disclosure. As shown in FIG. 1, the monitoring system 1 includes a vibrating module 11, an acoustic emission sensor and a processing device 13. The processing device 13 is electrically connected to or in communication connection with the vibrating module 11 and the acoustic emission sensor 12.

The vibrating module 11 is configured to make a processing tool to generate lateral or axial vibration, such that a target object is processed by the vibration transmitted thereto from the processing tool. The processing tool may be a grinding wheel, a cutting tool etc. In an embodiment, the target object may be a tool that needs to be washed by liquid (for example, water) during manufacturing process. The vibrating module 11 may include one or more oscillators (usually made of piezoelectric material). The acoustic emission sensor 12 is configured to sense an acoustic emission signal generated by a deformation of the target object with liquid as sensing medium. The sensing frequency of the acoustic emission sensor 12 may range from 10 kHz to 1,000 kHz. Because a non-contact medium (liquid) is used as a sensing medium, the sensing method may not be limited by the processing environment. The processing device 13 is configured to receive the acoustic emission signal and selectively adjust the operation parameter of the vibrating module 11 according to the acoustic emission signal. The processing device 13 may include one or more processors, wherein said processor is, for example, a central processing unit, a graphics processing unit, a microcontroller, a programmable logic controller (PLC) or any other processor with signal processing functions.

Figure 2:
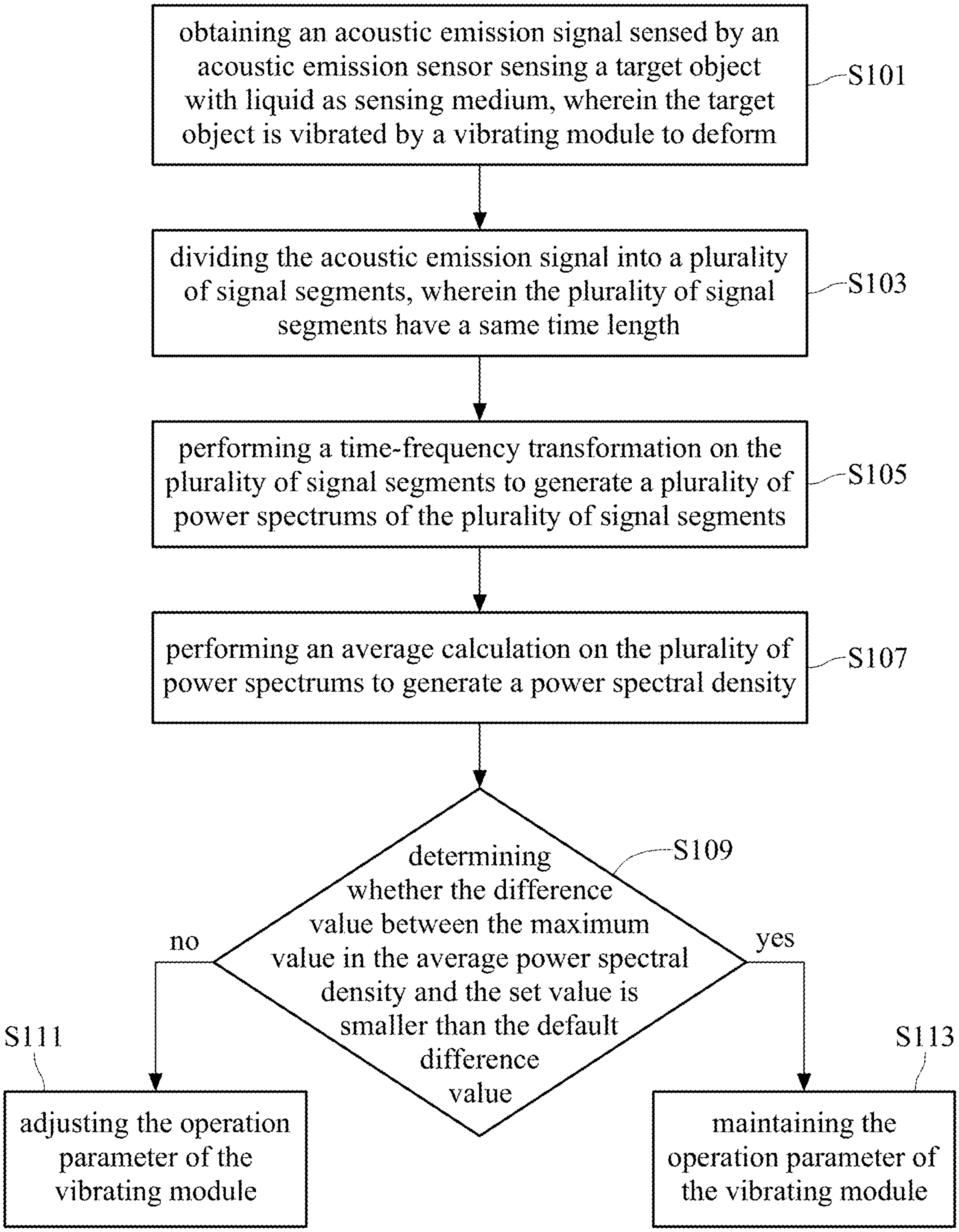
FIG. 2 is a flowchart illustrating a monitoring method according to an embodiment of the present disclosure.
Figure 3:
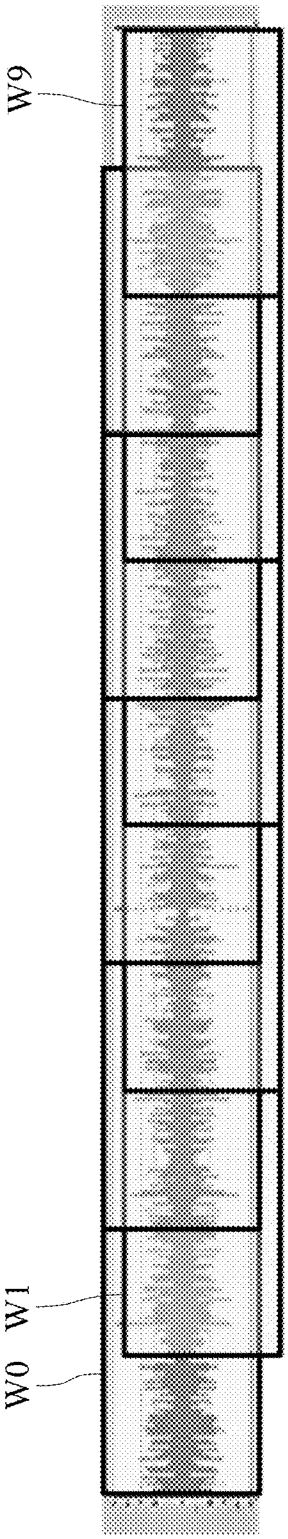
FIG. 3 is a schematic diagram illustrating the acoustic emission signal and the signal segments according to an embodiment of the present disclosure.

To explain the operation of the monitoring system 1 in more detail, please refer to FIG. 1, FIG. 2 and FIG. 3, wherein FIG. 2 is a flowchart illustrating a monitoring method according to an embodiment of the present disclosure, and FIG. 3 is a schematic diagram illustrating the acoustic emission signal and the signal segments according to an embodiment of the present disclosure. In FIG. 3, the unit of the horizontal axis of the acoustic emission signal is time (second), and the unit of the vertical axis is volt.

As shown in FIG. 2, the monitoring method includes step S101, step S103, step S105, step S107, step S109, step S111 and step S113. Step S113 is selectively performed. Steps shown in FIG. 2 are performed by the processing device 13.

Step S101: obtaining an acoustic emission signal sensed by an acoustic emission sensor sensing a target object with liquid as a sensing medium, wherein the target object is vibrated by a vibrating module to deform. The acoustic emission sensor 12 senses the acoustic emission signal generated by the target object with liquid as a sensing medium, wherein the target object is deformed by the vibration generated by the vibrating module 11. The processing device 13 obtains the acoustic emission signal generated by the deformation of the target object from the acoustic emission sensor 12 to determine the vibration status of the target object in the following steps.

Step S103: dividing the acoustic emission signal into a plurality of signal segments, wherein the plurality of signal segments have a same time length. In step S103, the processing device 13 divides the acoustic emission signal into signal segment W0 to signal segment W9, and each one of the signal segment W0 to the signal segment W9 has the same time length. For example, the processing device 13 starts the division from a starting point of the acoustic emission signal. In the signal segment W0 to the signal segment W9, two adjacent signal segments have an overlapping portion, and a time length of the overlapping portion may be half of the time length of each one the signal segment W0 to the signal segment W9. Take the signal segment W0 and the signal segment W1 for example, these two signal segments have an overlapping portion therebetween, and the time length of the overlapping portion is half of the time length of the signal segment W0, meaning half of the time length of the signal segment W1. Each signal segment may be represented by equation (1) below:

$$x_m(n) \triangleq w(n)x(n+mR) \qquad \text{equation (1)}$$

$x_m(n)$ is the signal segment; m is the number of the signal segment, such as signal segment W0 to signal segment W9 shown in FIG. 3; R is a size of a window hop, meaning the length of the overlapping portion.

It should be noted that the processing device 13 may set the time length of the overlapping portion according to the required data resolution and/or time required for performing the following time-frequency transformation, and setting the overlapping portion as half of the time length of the signal segment described above is merely an example. Specifically, the higher the required data resolution is, the higher the percentage of the overlapping portion is; and the shorter the time required for performing a following time-frequency transformation is, the lower the percentage of the overlapping portion is.

Step S105: performing a time-frequency transformation on the plurality of signal segments to generate a plurality of power spectrums of the plurality of signal segments. In step S105, the processing device 13 performs the time-frequency transformation on each one of the signal segment W0 to the signal segment W9 to generate the power spectrums corresponding to the signal segment W0 to the signal segment W9, respectively. The time-frequency transformation may include Fourier transformation. The time-frequency transformation may be implemented by equation (2) below:

$$P_{xm,M(w_k)} = \frac{1}{M}\left|FFT_{N,k}(x_m)\right|^2 \triangleq \frac{1}{M}\left|\sum_{n=0}^{N-1} x_m(n)e^{-j2\pi nk/N}\right|^2 \qquad \text{equation (2)}$$

M is the length of the signal segment; k is the number of the signal segments, and k is 10 in the example of FIG. 3; N is a sampling number of one signal segment, such as 1024.

One power spectrum is generated after performing the time-frequency transformation on a corresponding one of the signal segments, wherein in each power spectrum, the unit of the horizontal axis is frequency (Hz), and the unit of the vertical axis is the power spectral density (PSD) ($volt^2$/Hz). Corresponding to the signal segments in FIG. 3, ten power spectrums may be generated after step S105 is performed. In addition, take the target object being a grinding wheel for example, a frequency with highest power in the power spectrum represents a frequency of a maximum deformation, and has highest power contribution in the signal, and the power of other frequencies in the power spectrum represents deformations of other areas on the grinding wheel.

Figure 4:
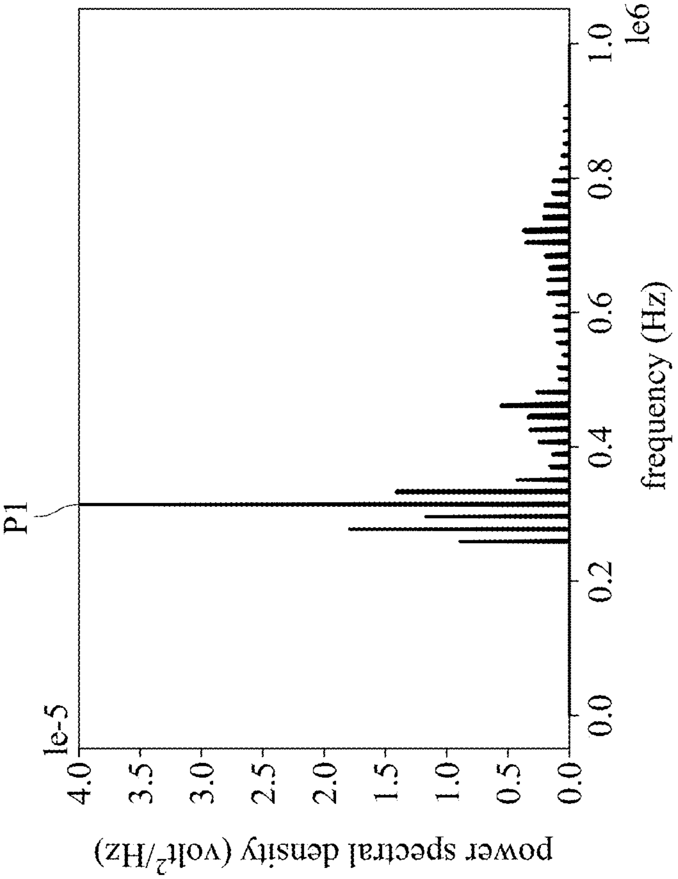
FIG. 4 is a schematic diagram illustrating a power spectrum according to an embodiment of the present disclosure.

Step S107: performing an average calculation on the plurality of power spectrums to generate a power spectral density. In step S107, the processing device 13 performs the average calculation on the power spectrums generated in step S105 to obtain an average power spectral density. After performing the average calculation on the power spectrum, the generated power spectral density may be as shown in FIG. 4. The average calculation may be a moving average calculation, which may be used to remove noise from the power spectrum. The average calculation may be implemented by equation (3) below:

$$S_x^W(w_k) \triangleq \frac{1}{K}\sum_{m=0}^{k-1} P_{xm,M(w_k)} \qquad \text{equation (3)}$$

k is the number of the signal segments, and k is 10 in the example of FIG. 3; m is the number of the signal segments, such as signal segment W0 to signal segment W9 shown in FIG. 3.

Then, in steps S109, S111 and S113, the processing device 13 adjusts or maintains an operation parameter of the vibrating module 11 according to a comparison result between a difference value and a default difference value, wherein the difference value is a difference between a maximum value of the power spectral density and a set value.

Step S109: determining whether the difference value between the maximum value in the average power spectral density and the set value is smaller than the default difference value. In step S109, the processing device 13 determines whether the difference value between the maximum value in the power spectral density and the set value is smaller than the default difference value to obtain the comparison result. The set value may be associated with a change in vibration output by the vibrating module 11, and the default difference value may be set according to usage requirement. The maximum value in the power spectral density may be the maximum value P1 shown in FIG. 4. Specifically, the vibrating module 11 is controlled by the processing device 13 to output vibration signal to the target object, and the processing device 13 controls the acoustic emission sensor 12 to sense the vibrated target object to obtain the acoustic emission signal. The maximum value in the power spectral density P1 is obtained by performing steps S103, S105 and S107 on the acoustic emission signal, and the set value may be the power spectral density of the vibration signal output by the vibrating module 11. In other words, the processing device 13 may perform the time-frequency transformation on the vibration signal as described in steps S103 and S105 to obtain the set value.

When the comparison result is that the difference value between the maximum value in the power spectral density and the set value is not smaller than the default difference value, it means that the target object may experience excessive deformation or damages due to the vibration generated by the vibrating module 11. Therefore, the processing device 13 performs step S111 to adjust the operation parameter of the vibrating module 11, wherein the operation parameter may include power corresponding to the vibrating module 11. For example, the processing device 13 may perform fuzzy inference on the difference value between the maximum value P1 and the set value to adjust the operation parameter of the vibrating module 11.

When the comparison result is that the difference value between the maximum value in the power spectral density and the set value is smaller than the default difference value, it means that the vibration generated by the vibrating module 11 does not cause excessive deformation or damages on the target object. Therefore, the processing device 13 performs step S113 to maintain the current operation parameter of the vibrating module 11.

After steps S111 and S113, the processing device 13 may perform step S101 again. Also, before step S103, the processing device 13 may perform pre-processing such as noise filtration and unbiased processing on the acoustic emission signal. The monitoring system and method according to one or more embodiments described above may be used on line and the monitoring system is easily installed, and may monitor the elastic wave signal released when the target object is subjected to plastic deformation or microscopic damage in real time.

Since the maximum value in the power spectral density (maximum power) represents the maximum deformation of the target object, by performing the time-frequency transformation and the average calculation to generate the average power spectral density, the operation parameter of the vibrating module 11 may be adjusted when the maximum deformation of the target object exceeds an allowable range, so that the maximum power in the power spectrum may fall in the allowable range, to ensure stable vibration and deformation.

Figure 5:
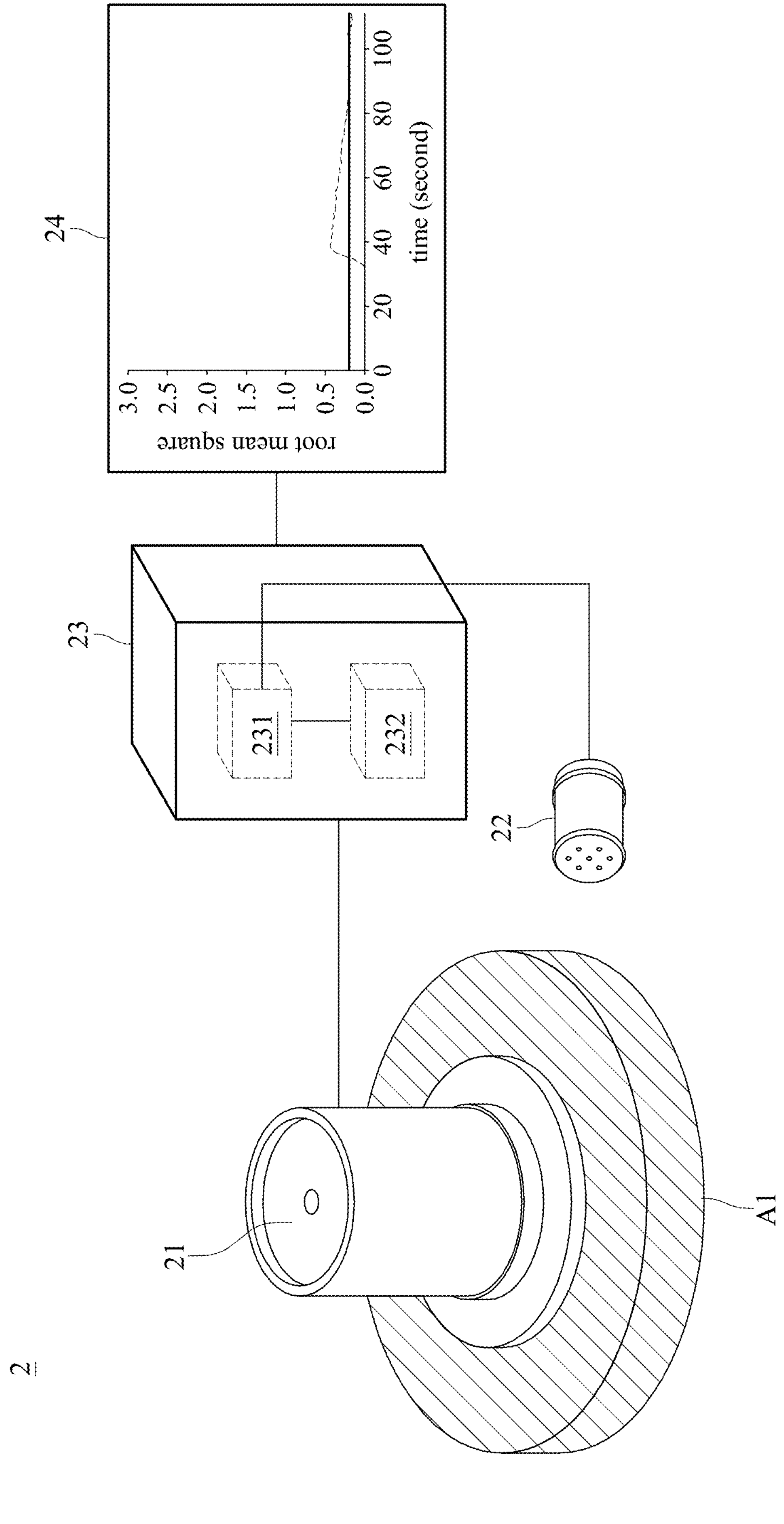
FIG. 5 is a schematic diagram illustrating a monitoring system according to another embodiment of the present disclosure.

Please refer to FIG. 5, wherein FIG. 5 is a schematic diagram illustrating a monitoring system according to another embodiment of the present disclosure. As shown in FIG. 5, the monitoring system 2 includes a vibrating module 21, an acoustic emission sensor 22, a processing device 23 and a display device 24. The processing device 23 is electrically connected to or in communication connection with the vibrating module 21, the acoustic emission sensor 22 and the display device 24. The implementations of the vibrating module 21 and the acoustic emission sensor 22 may be the same as that of the vibrating module 11 and the acoustic emission sensor 12 as described with reference to FIG. 1, their descriptions are not repeated herein.

The processing device 23 may include a computing element 231 and a transducer 232. The computing element 231 is connected to the acoustic emission sensor 22 and the transducer 232. The transducer 232 is connected to the vibrating module 21. The computing element 231 may include one or more processors as described above and may be configured to perform the monitoring method described with reference to FIG. 2. The transducer 232 may be controlled by the computing element 231 to output vibration signals. Further, take FIG. 2 as an example, the computing element 231 controls the transducer 232 to output the vibration signal corresponding to the initial operation parameter to the vibrating module 21 in step S101 (or before step S101) so that the vibrating module 21 vibrates the target object A1. The computing element 231 controls the transducer 232 to output the vibration signal corresponding to the adjusted operation parameter to the vibrating module 21 in step S111, or the computing element 231 controls the transducer 232 to output the vibration signal corresponding to the initial operation parameter to the vibrating module 21 in step S113. The vibrating module 21 then vibrates the target object A1 according to the operation parameter described in step S111 or step S113. The operation parameter may include output power of the transducer 232. The target object A1 may be the grinding wheel.

The display device 24 may be configured to display a sensing result of the acoustic emission sensor 22. For example, the processing device 23 may output the original waveform of the acoustic emission signal to the display device 24 for display. As shown in FIG. 5, the processing device 23 may also perform root mean square (RMS) calculation on the acoustic emission signal to obtain a waveform diagram presented in time domain and output the waveform diagram presented in time domain to the display device 24 for display. In addition, the display device 24 may also be configured to display the signal segments, the power spectrum, the power spectral density generated by the processing device 23 processing the acoustic emission signal, the operation parameter of the transducer 232 and the current vibration frequency of the transducer 232.

It should be noted that FIG. 5 illustrates the display device 24 as a display external to the processing device 23, but the display device 24 may also be a display device disposed on a shell of the processing device 23.

Further, before the computing element 231 obtaining the acoustic emission signal from the acoustic emission sensor 22, the computing element 231 may first determine whether the difference between the current vibration frequency and the previously stored vibration frequency is not greater than the preset frequency difference, wherein the previously stored vibration frequency may be a frequency corresponding to the operation parameter previously adjusted (or maintained) according the monitoring method of FIG. 2. When the difference between the current vibration frequency and the previously stored vibration frequency of the transducer 232 is not greater than the preset frequency difference, the computing element 231 may then perform step S101 shown in FIG. 2. On the contrary, the difference between the current vibration frequency and the previously stored vibration frequency of the transducer 232 is greater than the preset frequency difference, it means that there may be a deviation in the current vibration frequency of the transducer 232. Therefore, the computing element 231 may control the display device 24 to display a corresponding notification to notify technician to calibrate the transducer 232.

In view of the above description, the monitoring system and method according to one or more embodiment of the present disclosure may be used on line and the monitoring system is easily installed, and may monitor the elastic wave signal released when the target object is subjected to plastic deformation or microscopic damage in real time. By performing the time-frequency transformation and the average calculation to generate the average power spectral density, the operation parameter of the vibrating module may be adjusted when the maximum deformation of the target object exceeds an allowable range, so that the maximum power in the power spectrum may fall in the allowable range, to ensure stable vibration and deformation. Further, by using a non-contact medium (liquid) for sensing, the sensing method may not be limited by the processing environment.

What is claimed is:

1. A monitoring system, comprising:

a vibrating module configured to vibrate a target object;

an acoustic emission sensor configured to sense an acoustic emission signal generated by a deformation of the target object with liquid as sensing medium; and a processing device connected to the acoustic emission sensor and comprising a transducer connected to the vibrating module, and configured to receive the acoustic emission signal and perform:

dividing the acoustic emission signal into a plurality of signal segments, wherein the plurality of signal segments have a same time length;

performing a time-frequency transformation on the plurality of signal segments to generate a plurality of power spectrums of the plurality of signal segments;

performing an average calculation on the plurality of power spectrums to generate a power spectral density; and adjusting or maintaining an operation parameter of the vibrating module according to a comparison result between a difference value and a default difference value, and outputting, by the transducer, a vibrating signal corresponding to the operation parameter to the vibrating module to vibrate the target object, wherein the difference value is a difference between a maximum value of the power spectral density and a set value, wherein the processing device is configured to adjust the operation parameter of the vibrating module when the difference value between the maximum value and the set value is not smaller than the default difference value, and maintain the operation parameter of the vibrating module when the difference value between the maximum value and the set value is smaller than the default difference value.

2. The monitoring system according to claim 1, wherein the set value is associated with the vibrating signal.

3. The monitoring system according to claim 1, wherein the processing device further comprises:

a computing element connected to the acoustic emission sensor and the transducer.

4. The monitoring system according to claim 1, wherein the processing device is configured to perform a fuzzy inference on the difference value between the maximum value and the set value to adjust the operation parameter of the vibrating module.

5. The monitoring system according to claim 1, wherein the time-frequency transformation comprises Fourier transformation.

6. The monitoring system according to claim 1, wherein two adjacent signal segments among the plurality of signal segments has an overlapping portion, a time length of the overlapping portion is half of the time length of each one of the plurality of signal segments.

7. A monitoring method, performed by a processing device, comprising:

obtaining an acoustic emission signal sensed by an acoustic emission sensor sensing a target object with liquid as sensing medium, wherein the target object is vibrated by a vibrating module to deform;

dividing the acoustic emission signal into a plurality of signal segments, wherein the plurality of signal segments have a same time length;

performing a time-frequency transformation on the plurality of signal segments to generate a plurality of power spectrums of the plurality of signal segments;

performing an average calculation on the plurality of power spectrums to generate a power spectral density; and adjusting or maintaining an operation parameter of the vibrating module according to a comparison result between a difference value and a default difference value, and outputting, by a transducer, a vibrating signal corresponding to the operation parameter to the vibrating module to vibrate the target object, wherein the difference value is a difference between a maximum value of the power spectral density and a set value, and wherein adjusting or maintain the operation parameter of the vibrating module according to the comparison result between the difference value and the default difference value comprises: adjusting the operation parameter of the vibrating module when the difference value between the maximum value and the set value is not smaller than the default difference value, and maintaining the operation parameter of the vibrating module when the difference value between the maximum value and the set value is smaller than the default difference value.

8. The monitoring method according to claim 7, wherein the set value is associated with the vibrating signal.

9. The monitoring method according to claim 7, wherein adjusting the operation parameter of the vibrating module comprises:

performing a fuzzy inference on the difference value between the maximum value and the set value.

10. The monitoring method according to claim 7, wherein the time-frequency transformation comprises Fourier transformation.

11. The monitoring method according to claim 7, wherein two adjacent signal segments among the plurality of signal segments has an overlapping portion, a time length of the overlapping portion is half of the time length of each one of the plurality of signal segments.

* * * * *